United States Patent [19] [11] 3,798,062
Mroczeck et al. [45] Mar. 19, 1974

[54] METHOD OF MANUFACTURING A PLANAR DEVICE

[75] Inventors: Werner Mroczeck; Werner Scherber, both of Heilbronn, Germany

[73] Assignee: Licentia Patent-Vermaltungs-GmbH, Frankfurt am Main, Germany

[22] Filed: Sept. 27, 1971

[21] Appl. No.: 184,176

[30] Foreign Application Priority Data
Sept. 30, 1970 Germany............................ 2047998

[52] U.S. Cl................... 117/212, 117/931, 148/187
[51] Int. Cl. ............................................. H01l 7/44
[58] Field of Search ..... 117/212, DIG. 12; 204/192; 148/187

[56] References Cited

UNITED STATES PATENTS

| | | | |
|---|---|---|---|
| 3,503,813 | 3/1970 | Tamamoto | 148/187 |
| 3,281,915 | 11/1966 | Schramm | 148/187 |
| 3,455,020 | 7/1969 | Dawson et al. | 148/187 X |
| 3,438,873 | 4/1969 | Schmidt | 148/187 X |
| 3,649,886 | 3/1972 | Kooi | 117/212 X |
| 3,658,678 | 4/1972 | Gregor et al. | 204/192 |
| 3,607,697 | 9/1971 | Shirn et al. | 204/192 |

OTHER PUBLICATIONS

Chemical Abstracts, Vol. 68, 1968, p. 7048, 73015x. Kuwano.

*Primary Examiner*—Ralph S. Kendall
*Assistant Examiner*—Michael W. Ball
*Attorney, Agent, or Firm*—Spencer & Kaye

[57] ABSTRACT

A method of manufacturing a planar device includes removing at least a portion of an insulating layer used as a mask for producing a region or regions in a semiconductor body and replacing this insulating layer with a layer of silicon nitride.

12 Claims, 8 Drawing Figures

METHOD OF MANUFACTURING A PLANAR DEVICE

BACKGROUND OF THE INVENTION

This invention relates to a method of manufacturing a planar device. In planar devices with plastic packages, instabilities occur not infrequently after prolonged operation at high voltages and at higher temperatures, both with regard to the reverse current and the reverse voltage. This is particularly true with high voltage semiconductor devices.

The invention is based on the fact that these instabilities may be attributed to the permeability of thermally grown silicon dioxide to extraneous substances, such as alkali and water. These extraneous substances can penetrate from the outside through the platic package, because plastics are known to be not completely impermeable, but they may also originate in the plastic material itself, or may have been incorporated into the oxide of the semiconductor surface during the treatment of the semiconductor wafer.

SUMMARY OF THE INVENTION

It is an object of the invention to provide a method in which these disadvantages have been eliminated or substantially reduced, and in which a better passivation of semiconductor surfaces or of p-n junctions is achieved than in known methods.

According to the invention, there is provided a method of manufacturing a planar device including the steps of producing one or more regions in a semiconductor body by use of an insulating layer mask, removing at least part of the insulating layer and depositing a silicon nitride layer on the surface of the semiconductor body from which the insulating layer has been removed.

BRIEF DESCRIPTION OF THE DRAWINGS

The invention will now be described in greater detail, by way of example, with reference to the accompanying drawings, in which.

DESCRIPTION OF THE PREFERRED EMBODIMENTS

The invention proposes that in the manufacture of planar devices, the insulating layer present on the surface of the semiconductor body is removed entirely or partly after the production of the semiconductor zone(s), and a silicon nitride layer of $SiH_4$ and $N_2$ is produced on this surface by means of a glow discharge.

This silicon nitride layer replaces, therefore, the original insulating layer present as a diffusion mask.

The deposition of the silicon nitride layer may be effected, for example, at a temperature of about 360°C. At this temperature no disadvantageous effects need be expected either on the surface or within the semiconductor. The semiconductor surface is preferably treated prior to the deposition of the silicon nitride layer in glow discharge with oxygen or with an inert gas, and is thereby cleaned. This is effected preferably in the same apparatus in which the nitride layer is deposited.

The semiconductor regions in the semiconductor body are contacted after the production of the silicon nitride layer. To this end, contact making windows are made in the silicon nitride layer, and the areas of the semiconductor regions, exposed through the contact making windows, are covered with contacting material. This may be achieved, for example, by evaporation.

Obviously there is also the possibility according to a further feature of the invention of applying one or more other insulating layers to the silicon nitride layer. A suitable material for an additional insulating layer is, for example, silicon dioxide. This layer of silicon dioxide is produced, for example, by means of a pyrolytic deposition of silicon dioxide from the $SiH_4$-$O_2$ reaction or, for example, conveniently in the same apparatus as the silicon nitride layer from $SiH_4$ and $O_2$ in a glow discharge. The invention is suitable advantageously for all semiconductor devices, such as, diodes, transistors or integrated circuits.

One embodiment of the invention will now be described:

For manufacturing a planar transistor according to the invention, a semiconductor body, for example, of silicon may be used, one surface of this semiconductor body with the type of conductivity of the collector region is covered with an insulating layer as diffusion mask, consisting, e.g., of silicon dioxide or silicon nitride, and the base region and the emitter region are diffused into the semiconductor body through windows in this insulating layer.

Figure 1:
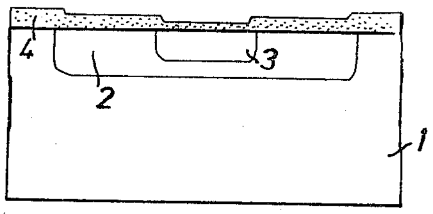
FIG. 1 is a sectional view of a semiconductor body having regions formed therein and an insulating layer thereon.

Referring to the drawings, FIG. 1 shows the planar transistor in the stage in which the base region 2 and the emitter region 3 are already diffused in the semiconductor body 1. On the surface of the semiconductor is an insulating layer 4, for example of silicon dioxide, used as diffusion mask. The step-shaped configuration of the insulating layer is due to the formation of the diffusion windows for the base and emitter regions.

Figure 2:
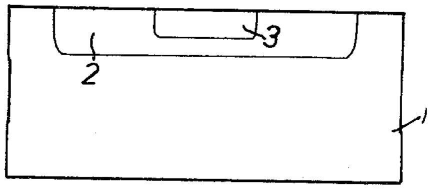
FIG. 2 is a view similar to FIG. 1 but with the insulating layer removed.
Figure 3:
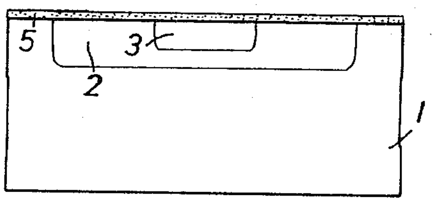
FIG. 3 is a view similar to FIG. 2 but with a layer of silicon nitride replacing the insulating layer.

After the emitter diffusion, the insulating layer 4 is removed from the semiconductor surface according to FIG. 2, and is replaced, according to FIG. 3, by a new insulating layer 5 consisting of a layer of silicon nitride. The nitride layer is produced in a glow discharge of the gases $SiH_4$ and $N_2$. The deposition of the resulting silicon nitride layer takes place, for example, at a temperature of 350°C. Prior to the deposition of the silicon nitride layer, the semiconductor surface is cleaned, and this is also carried out in a glow discharge. For this purpose, an oxygen or inert gas atmosphere is used. Preferably this preliminary treatment is carried out in the same apparatus as the deposition of the silicon nitride layer.

Figure 4:
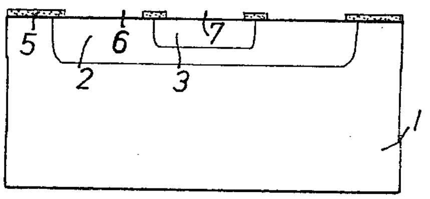
FIG. 4 is a view similar to FIG. 3 but showing contact making windows formed in the silicon nitride layer.

After the production of the silicon nitride layer windows are made in this insulating layer as shown in FIG. 4, for contacting the base and emitter regions, namely a base contact making window 6 and an emitter contact making window 7. In the embodiment shown, the collectcr zone is contacted on the side remote from the emitter zone by mounting a collector electrode on the semiconductor body, but this is not shown in the drawing.

Figure 5:
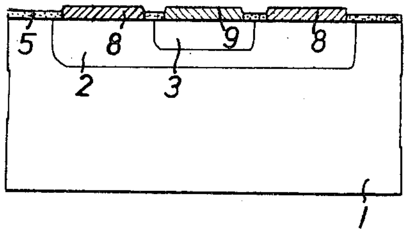
FIG. 5 is a view similar to FIG. 4 but showing the contact electrodes.

FIG. 5 shows finally the contacting of the base and emitter region by a base electrode 8, and an emitter electrode 9. These electrodes may be produced, for example, by evaporation.

Figure 6:
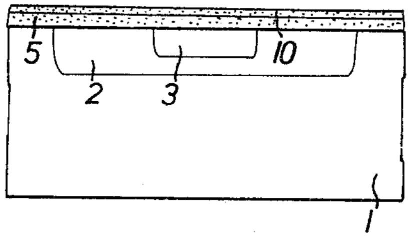
FIG. 6 is a view corresponding to FIG. 3 but having a further insulating layer on the silicon nitride layer.
Figure 7:
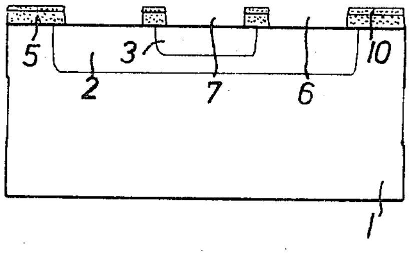
FIG. 7 is a view corresponding to FIG. 4 with the further insulating layer.
Figure 8:
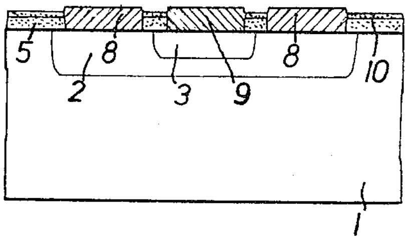
FIG. 8 is a view corresponding to FIG. 5 with the further insulating layer.

FIGS. 6 to 8 correspond in all details to FIGS. 3 to 5 and differ from these figures only in that the semiconductor surface is not covered only by a silicon nitride layer 5 after the removal of the insulating layer 4, originally present as diffusion mask, but according to a further feature of the invention additionally by a further insulating layer 10, consisting, for example, of silicon dioxide and formed on the silicon nitride layer 5. The insulating layer 10 is produced, for example, by pyrolytic deposition of silicon dioxide from the $SiH_4$-$O_2$ reaction, or preferably in the same apparatus as the nitride layer in a glow discharge of $SiH_4$ and $O_2$. In this embodiment, the contact making windows 6 and 7 according to FIG. 7 must be provided not only in the silicon nitride layer 5, but also in the insulating layer 10. The contact making windows are produced preferably in both cases by means of photolithographic methods.

It will be understood that the above description of the present invention is susceptible to various modifications changes and adaptations.

What is claimed is:

1. A method of manufacturing a planar semiconductor device in a semiconductor body with an insulating layer on the surface thereof comprising in the order recited the steps of: producing all desired semiconductor regions in the semiconductor body using the insulating layer as a diffusion mask, removing at least the portion of said insulating layer overlying the produced semiconductor regions, cleaning the surface of said semiconductor body by treating it in a glow discharge, and depositing a silicon nitride layer which is substantially free of any doping material on the surface of said semiconductor body from which said insulating layer has been removed.

2. A method as defined in claim 1, and comprising producing said silicon nitride layer from $SiH_4$ and $N_2$ in a glow discharge.

3. A method as defined in claim 2, and comprising depositing said silicon nitride layer at a temperature of about 350°C.

4. A method as defined in claim 1, and comprising carrying out said cleaning of said surface of said semiconductor body in an oxygen atmosphere.

5. A method as defined in claim 1, and comprising carrying out said cleaning of said surface of said semiconductor body in an inert gas atmosphere.

6. A method as defined in claim 1, and comprising carrying out said cleaning of said surface of said semiconductor body in the same apparatus as is used for the deposition of said silicon nitride layer.

7. A method as defined in claim 1, further comprising forming a further insulating layer on said silicon nitride layer.

8. A method as defined in claim 7, and comprising using silicon dioxide as said further insulating layer.

9. A method as defined in claim 7, and comprising forming said further insulating layer in the same apparatus as is used for forming the silicon nitride layer.

10. A method as defined in claim 1, further comprising forming a contact making window in said silicon nitride layer for each of said regions in said semiconductor body for providing an opening for a contact to be applied.

11. A method as defined in claim 1, further comprising forming a further insulating layer on said silicon nitride layer and forming a contact making window in said silicon nitride layer and in said further insulating layer for each of said regions in said semiconductor body for providing an opening for a contact to be applied.

12. A method as defined in claim 1 wherein all of the insulating layer on the surface of the semiconductor body is removed prior to depositing the silicon nitride layer.

* * * * *

UNITED STATES PATENT OFFICE
CERTIFICATE OF CORRECTION

Patent No. 3,798,062 Dated March 19th, 1974

Inventor(s) Werner Mroczek and Werner Scherber

It is certified that error appears in the above-identified patent and that said Letters Patent are hereby corrected as shown below:

In the heading of the patent, line 6, change "Vermaltungs" to --Verwaltungs--.

Signed and sealed this 1st day of October 1974.

(SEAL)
Attest:

McCOY M. GIBSON JR.
Attesting Officer

C. MARSHALL DANN
Commissioner of Patents